United States Patent
Schneider et al.

(10) Patent No.: US 9,942,335 B2
(45) Date of Patent: Apr. 10, 2018

(54) CONTEXTUAL CONNECTION INVITATIONS

(71) Applicant: Google Inc., Mountain View, CA (US)

(72) Inventors: Michael Patrick Schneider, Venice, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 14/599,172

(22) Filed: Jan. 16, 2015

(65) Prior Publication Data
US 2016/0212230 A1    Jul. 21, 2016

(51) Int. Cl.
G06F 15/16    (2006.01)
H04L 29/08    (2006.01)
G06Q 50/00    (2012.01)

(52) U.S. Cl.
CPC ............ H04L 67/22 (2013.01); G06Q 50/01 (2013.01); H04L 67/306 (2013.01)

(58) Field of Classification Search
CPC ........ H04L 67/22; H04L 67/306; G06Q 50/01
See application file for complete search history.

(56) References Cited

U.S. PATENT DOCUMENTS

| | | | | |
|---|---|---|---|---|
| 8,452,797 B1* | 5/2013 | Paleja | ................... | G06Q 30/02 707/767 |
| 9,137,323 B2* | 9/2015 | Shah | ................... | G06Q 10/107 |
| 2007/0067271 A1* | 3/2007 | Lu | ..................... | G06Q 10/10 |
| 2007/0192299 A1 | 8/2007 | Zuckerberg et al. | | |
| 2007/0282887 A1* | 12/2007 | Fischer | ............ | G06F 17/30867 |
| 2008/0004941 A1* | 1/2008 | Calabria | ............... | G06Q 10/10 705/7.33 |
| 2008/0229244 A1* | 9/2008 | Markus | ............. | G06F 17/30867 715/811 |
| 2008/0243853 A1* | 10/2008 | Reding | ................... | H04L 51/32 |
| 2009/0031030 A1* | 1/2009 | Schmidt | ............... | H04L 67/306 709/227 |

(Continued)

OTHER PUBLICATIONS

International Search Report and Written Opinion of the International Search Authority dated Mar. 17, 2016 in International Patent Application No. PCT/US2016/012079.

*Primary Examiner* — Moustafa M Meky
*Assistant Examiner* — Blake Rubin
(74) *Attorney, Agent, or Firm* — Byrne Poh LLP

(57) ABSTRACT

Systems and methods are provided for including information in an invitation from a first to connect with a second user that identifies a context regarding how the first user found the second user. A system can include a request component configured to receive, at a first network source, information identifying a second user that a first user has selected to send an invitation to connect with at the first network source, a context component configured to determine a context regarding selection of the second user by the first user, including where the first user found the information identifying the second user, and a generation component configured to generate an invitation that invites the second user to connect with the first user at the first network source. The invitation comprises first user identification information and context information identifying the context regarding the selection of the second user by the first user.

21 Claims, 11 Drawing Sheets

(56) References Cited

U.S. PATENT DOCUMENTS

| | | | |
|---|---|---|---|
| 2009/0070852 A1* | 3/2009 | Chijiiwa | G06Q 10/107 726/1 |
| 2009/0222522 A1* | 9/2009 | Heaney | G06Q 10/107 709/206 |
| 2010/0042511 A1* | 2/2010 | Sundaresan | G06Q 10/10 705/26.1 |
| 2010/0144426 A1* | 6/2010 | Winner | G07F 17/32 463/25 |
| 2010/0281113 A1* | 11/2010 | Laine | G06Q 10/10 709/204 |
| 2010/0299276 A1* | 11/2010 | Shahine | G06Q 50/01 705/319 |
| 2010/0325218 A1* | 12/2010 | Castro | G06Q 50/01 709/206 |
| 2011/0055930 A1* | 3/2011 | Flake | G06F 21/6245 726/27 |
| 2011/0191352 A1* | 8/2011 | Jones | G06F 17/30 707/749 |
| 2011/0208822 A1* | 8/2011 | Rathod | G06Q 30/02 709/206 |
| 2011/0289422 A1* | 11/2011 | Spivack | G06Q 10/109 715/739 |
| 2012/0036015 A1* | 2/2012 | Sheikh | G06Q 30/02 705/14.54 |
| 2012/0110096 A1* | 5/2012 | Smarr | G06Q 10/10 709/206 |
| 2012/0150960 A1* | 6/2012 | Nalawade | G06Q 30/02 709/204 |
| 2012/0166453 A1* | 6/2012 | Broder | G06Q 10/10 707/752 |
| 2013/0013682 A1* | 1/2013 | Juan | G06Q 50/01 709/204 |
| 2013/0013701 A1* | 1/2013 | Cherukuri | H04L 12/1818 709/206 |
| 2013/0040277 A1* | 2/2013 | Linton | G06Q 10/101 434/350 |
| 2013/0073983 A1* | 3/2013 | Rasmussen | G06Q 30/02 715/753 |
| 2013/0117290 A1* | 5/2013 | Park | G06F 8/31 707/756 |
| 2013/0144818 A1* | 6/2013 | Jebara | G06N 99/005 706/12 |
| 2013/0201176 A1* | 8/2013 | Lee | G09G 5/003 345/214 |
| 2013/0215116 A1* | 8/2013 | Siddique | G06Q 30/0643 345/420 |
| 2013/0219299 A1* | 8/2013 | Yerli | G06F 3/0481 715/753 |
| 2013/0239132 A1* | 9/2013 | Rakoff | H04N 21/23439 725/13 |
| 2013/0268592 A1* | 10/2013 | Yerli | G06Q 10/10 709/204 |
| 2013/0275429 A1* | 10/2013 | York | G06F 17/30029 707/737 |
| 2013/0318180 A1* | 11/2013 | Amin | H04L 65/403 709/206 |
| 2013/0326373 A1* | 12/2013 | Lisabeth | H04L 51/32 715/753 |
| 2013/0332307 A1* | 12/2013 | Linden | G06Q 30/0631 705/26.7 |
| 2013/0346877 A1* | 12/2013 | Borovoy | H04L 65/403 715/753 |
| 2014/0006977 A1* | 1/2014 | Adams | H04L 51/32 715/758 |
| 2014/0136624 A1* | 5/2014 | Abhyanker | G06Q 50/01 709/204 |
| 2014/0195675 A1* | 7/2014 | Silver | H04L 65/1083 709/224 |
| 2014/0282656 A1* | 9/2014 | Belyaev | H04N 21/25841 725/14 |
| 2014/0317645 A1* | 10/2014 | Cheung | H04N 21/2668 725/10 |
| 2014/0317660 A1* | 10/2014 | Cheung | H04N 21/6175 725/44 |
| 2015/0006177 A1* | 1/2015 | DeLand | H04L 12/1813 704/251 |

* cited by examiner

CONTEXTUAL CONNECTION INVITATIONS

TECHNICAL FIELD

This application generally relates to systems and methods for including context information in an electronic message regarding how or where the sender selected the recipient.

BACKGROUND

Many websites and applications allow users to invite their friends or acquaintances to become new members/users of the website or application. By allowing users to promote a website or application externally, the website or application can take advantage of the viral effect and become popular very quickly. In addition, many social websites and applications are designed to facilitate connecting members with other members via user initiated conversation invitations. However one problem with user initiated invitations is that a user receiving the invitation may not recognize the person who is inviting them, or may not know how this person got their contact information, thus they may not trust and respond to the invitation.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
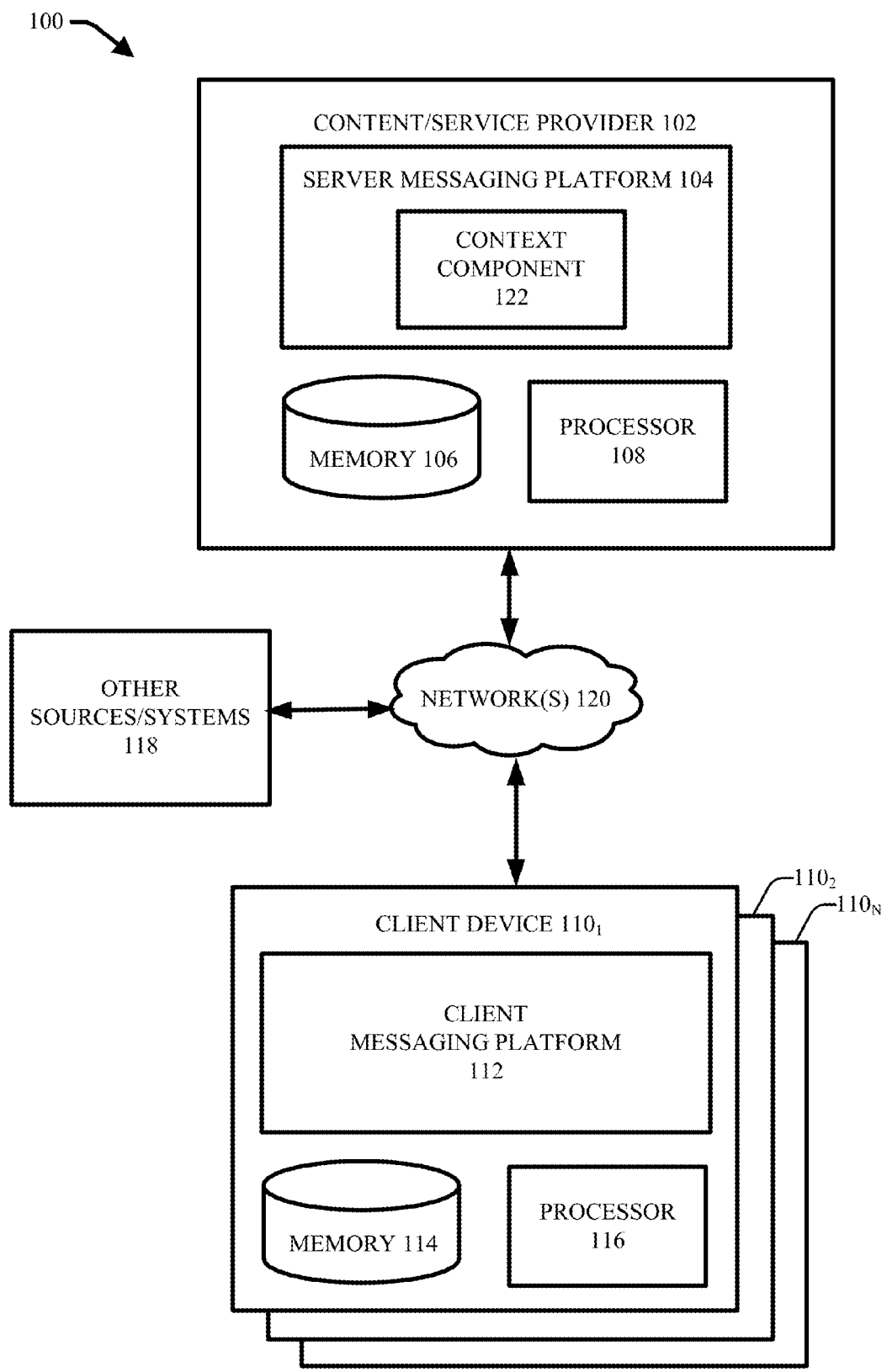
FIG. 1 illustrates an example system for including information in an invitation from a first user to connect with a second user that identifies a context regarding how or where the first user found the second user, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

Given the expansion of the Internet, most people have some form of virtual presence, whether it be a profile on a social networking website, a channel on a video sharing website, a personal website or webpage (e.g., a user's blog), a name or picture recognition on a public website (e.g., on an employer's website), a name or picture recognition in a public article or record, etc. These forms of virtual presence are often associated with contact information for the individual and/or a mechanism via which to contact the individual (e.g., email, instant message, text message, cellular voice connection, etc.). In actuality, many people have multiple online presences. Accordingly, there are often many ways for one person to find and contact another person via one or more of their virtual presences. When a user gets a message from a sender who they may not recognize well or at all based on information identifying the sender in the message (e.g., the sender's name, profile name, messaging number or address, picture, etc.), the user will most likely not trust the message and thus not respond to or even read the message.

By way of introduction, the subject matter described in this disclosure relates to a mechanism for adding trust to an electronic message by including context information in the message regarding at least how the sender selected the recipient of the message. The subject mechanism aims to give a message recipient more context around where the message came from, who is sending it, and how they are connected to the sender, thus making the recipient user more likely to accept the invitation. In an aspect, information is gathered/determined regarding how the sender found information identifying the recipient and/or contact information for the recipient. This information is then included in the message. When the recipient user receives the message, the recipient will be provided with the information describing a context of how the sender knows and/or found the recipient, thus adding an element of trust to the message.

For example, the sender of a message may have selected the recipient from a list of personal contacts (e.g., phone contact, social network contact) including information identifying other people and their respective phone numbers and/or email addresses. This message might read: "the sender got your profile because he has your phone number," or "the sender found your profile from his phone contacts." In another example, the sender may have come across the recipient's channel page while navigating about a video sharing website and choose to send the recipient an invitation to chat about his channel page. According to this example, the message could state: "the sender found your profile on your channel page." In another example, a first user may select a second user to send a message to in association with a comment provided by the second user in a messaging forum. According to this example, the message could state: "the sender found your profile from your comment [insert comment here] you made in discussion forum [insert name of discussion forum] on Dec. 5 2014."

In one or more aspects, a system is disclosed that includes a memory that stores computer executable components and a processor that executes at least the computer executable components stored in the memory. These components include an invitation request component configured to receive, at a first network source, information identifying a second user that a first user has selected to send an invitation to connect with at the first network source, and a context component configured to determine a context regarding selection of the second user by the first user, including where the first user found the information identifying the second user. These components further include an invitation generation component configured to generate an invitation that invites the second user to connect with the first user at the first network source, the invitation comprising first user identification information and context information identifying the context regarding the selection of the second user by the first user, and a delivery component configured to determine second user contact information for the second user based on the information identifying the second user, and send the invitation from the first network source to the second user using the second user contact information.

In another aspect, a device is disclosed that includes a memory that stores computer executable components and a processor that executes at least the computer executable components stored in the memory. These components include an invitation component configured to receive, from a server employed by a service provider, an invitation that invites a second user to connect with a first user via an application of the service provider. The invitation includes first user identification information and context information identifying a context regarding the selection of the second user by the first user, including where the first user found information identifying the second user. These components further include a presentation component configured to generate a graphical user interface comprising the invitation for display to the second user.

Still in yet another aspect, a tangible computer-readable storage medium is disclosed that includes computer-readable instructions that, in response to execution, cause a computing system to perform various operations. These operations include, receiving, at a first network source, information identifying a second user that a first user has selected to send an invitation to connect with at the first network source, and determining a context regarding selection of the second user by the first user, including where the first user found the information identifying the second user. These operations further include generating an invitation that invites the second user to connect with the first user at the first network source, the invitation comprising first user identification information and context information identifying the context regarding the selection of the second user by the first user, determining second user contact information for the second user based on the information identifying the second user, and sending the invitation from the first network source to the second user using the second user contact information.

Referring now to the drawings, with reference initially to FIG. 1, presented is a diagram of an example system 100 for including context information in an electronic message regarding how or where the sender selected the recipient in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes content/service provider 102, a plurality of client devices $110_1$-$110_N$ (where N is a number), and one or more other system and sources 118. Content/service provider 102 can include memory 106 for storing computer executable components and instructions and processor 108 to facilitate operation of the instructions (e.g., computer executable components and instructions). Similarly, client devices $110_1$-$110_N$ can include memory 114 for storing computer executable components and instructions and processor 116 to facilitate operation of the instructions (e.g., computer executable components and instructions).

The various components of system 100 can be connected either directly or via one or more networks 120. Such network(s) can include wired and wireless networks, including but not limited to, a cellular network, a wide area network (WAD, e.g., the Internet), a local area network (LAN), or a personal area network (PAN). For example, client device $110_1$ can communicate with content server 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Content/service provider 102 can include an entity configured to provide various content and/or services to a users via their respective client devices $110_1$-$110_N$ over a network (e.g., the Internet), including at least a messaging service that facilitates electronic messaging between users (e.g., emailing, instant messaging, short messaging service (SMS) texting, calling, video calling, etc). For example, content/service provider 102 can include a social networking website or application configured to provide various social networking services to users. Social networking websites/applications provide platforms for users to build social networks or social relations among people who share interests, activities, backgrounds or real-life connections. Social network websites/application provide web-based services that allow individuals to create a profile, to create a list of users with whom to share connections, and view and cross the connections within the system. Many social networking sites allow users to share ideas, pictures, posts, activities, events, interests with people in their network and provide and provide means for users to interact over the Internet, such as via e-mail and instant messaging.

In another aspect, content/service provider 102 can include a information store that provides access to data included in the information store via a network. In another aspect, content/service provider can include an online merchant configured to connect users in association with facilitating purchases of goods or services. In another example, content/service provider 102 can include can include a website or application configured to present pictures, articles, blogs, videos, or other types of content items to client devices 110 via a network 120. According to this example, the content provided by the website or application can be configured for downloading, streaming or merely viewing at a client device 110 via the network.

In an exemplary embodiment, content/service provider 102 includes a streaming media provider configured to provide streamed media to client devices over a network. For example, content/service provider 102 can include a media provider that has access to a voluminous quantity (and potentially an inexhaustible number) of shared media (e.g., video and/or audio) files. The media provider can further stream these media files to one or more users at respective client devices $110_1$-$110_N$). The media can be stored in memory associated with the media provider (e.g., memory 106) and/or at various servers employed by the media provider and accessed by client devices using a networked platform (e.g., a website platform, a cellular application) employed by the media provider. For example, the media provider can provide and present media content to a user via a website that can be accessed by a client device using a browser. In another example, the media provider can provide and present media to a user via a mobile/cellular application provided on a client device (e.g., where the client device is a smartphone or the like).

In an aspect, the media provider can facilitate video sharing between users in a social networking environment. For example, respective users can establish profiles with the media provider and connect with other users sharing similar media interests. In addition, users can establish their own channels which serve as avenues via which they share their own media (e.g., media created, collected or otherwise associated with ownership by the user). As used herein, the term channel refers to data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

The term media content or media item can include but is not limited to streamable media (e.g., video, live video, video advertisements, animations, music, music videos, sound files and etc.) and static media (e.g., pictures, thumbnails). The term media content or media item also includes a collection of media items such as a playlist including several videos or songs, or a channel including several videos or songs associated with a single media creator or curator.

Client devices $110_1$-$110_N$ can include any suitable computing device associated with a user and configured to interact with content/service provider 102 via a network. For example, a client device 110 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 110.

Content/service provider 102 can include server messaging platform 104 to facilitate electronic communication between users via their respective client devices $110_1$-$110_N$ in association with provision of other content and/or services to users. For example, server messaging platform 104 can facilitate sending messages, invitations and/or notifications related between users in association with providing social networking services, media sharing services, etc. In another aspect, server messaging platform 104 can provide instant messaging, short messaging service (SMS) texting, calling, video calling, multimedia messaging, etc. between users using various communication protocol (e.g., internet protocol (IP)) in association with provision of social networking services, media sharing services, etc. However is some aspects, content/service provider 102 can include a system solely dedicated to facilitating communication (e.g., text and/or multimedia communications) between users via a network using various communication protocol and a network based platform (e.g., a website or an application).

In an aspect, client devices $110_1$-$110_N$ can respectively include a client messaging platform 112 (e.g., a messaging client), to facilitate employing the messaging services afforded by server messaging platform 104. According to this aspect, server messaging platform 104 can function as a messaging application server configured to provide messaging services to users via their respective client messaging platforms 112 (e.g., which are configured to operate as thin client messaging applications). Client messaging platform 112 and server messaging platform 104 can include complimentary and/or same or similar functionality depending on the implementation of system 100.

In accordance with an embodiment, a user of content/service provider 102 can employ server messaging platform 104 to send an electronic message to another user. (In some aspects, in order to user the messaging service afforded by server messaging platform 104, the user sending the message can employ a corollary client messaging platform 112 configured to interact with server messaging platform 104). The type and nature of the message can vary depending on the purpose and offerings of content/service provider 102. For example, the message can include an invitation from a first user of content/service provider 102 that invites a second user, who is not a member/user of the content/service provider, to become a new member/user. For instance, many websites and applications allow users to invite their friends or acquaintances to become new members/users of the website or application (e.g., by downloading the application, registering with the website or application, setting up an account, setting up a profile, etc.). By allowing existing users to promote a website or application externally, the website or application can take advantage of the viral effect and become popular very quickly. However one problem with invitations is that a user receiving the invitation may not recognize the person who is inviting them, or may not know how this person got their contact information, thus they may not trust the invitation.

In another example, the message can include a request from a first user of content/service provider 102 to connect (e.g., exchange text and/or multimedia messages, such as voice and video, in a real-time or non-real time format) with a second user of the content/service provider 102, wherein both users can have established accounts or profiles with the content/service provider 102. According to this example, content/service provider 102 can provide services that are designed to connect members with other members via user initiated conversation invitations. For instance, a first user of a social networking service, online dating service or video streaming content provider may select a profile of second user and send the second user a request to begin a chat session or to join a messaging group. In another example, the message can include a request from a first user of content/service provider 102 to connect with a second user via the messaging service provided by content/service provider 102, wherein the second user is not a member of the content/service provider 102 and/or has not registered for the messaging service provided by content/service provider 102.

Server messaging platform 104 can include context component 122 to determine or infer a context regarding selection of the second user (the message recipient) by the first user (the message sender) in association with a request to send a message from the first user to the second user. Given the various avenues via which people can establish an online presence/identity to facilitate contact between one another, a user can receive a message over various messaging mediums (e.g., email, phone number, etc.), from various messaging sources (e.g., network sources such as devices websites, webpages, and/or applications the user is affiliated with) and from various entities (other users known and unknown). Due to the various mechanisms via which a user may open themselves up for receiving messages from others, the user may not recognize the person who is messaging them, or may not know how this person got their contact information, thus they may not trust the message. Context component 122 is configured to determine or infer contextual factors regarding how, when, where and/or why the first user came to contact the second user.

For example, context component 122 can determine whether the first user had and/or provided contact information (e.g., phone number or email address) for the second user in association with requesting a message to be sent to the second user. Context component 122 can also determine or infer when, where (e.g., actual physical location) and other contextual factors regarding how the first user received the second user's contact information (e.g., from the second user directly, from a third user, from another network source, etc.). In another example, context component 122 can determine or infer whether, where and/or how the first user found a profile/online identity of the second user and at what network source. According to this example, context component 122 can determine a particular website or webpage where the first user found the second user's profile. This website or webpage can be provided by content/service provider 102 or another source or system (e.g., an external social networking system).

Context component 122 can also determine other contextual factors regarding selection of the second user's profile by the first user, such as whether an instance of the second user's profile or online identity (e.g., a name, a screen name, a thumbnail image representing the second user, an icon representing the second user, etc.), was selected by the first user in association with a content item. For example, the content item could include a comment provided by the second user, a channel of the second user, an article posted by the second user, a picture including the second user, a video or song associated with the second user, etc.). Other contextual factors regarding selection of the second user's profile by the first user can relate to why the first user selected the second user out of a pool of users, such as whether the second user belongs to a group that the first user belongs to, whether the second user and the first user are friends or follow one another on a particular social network, whether the second user was suggested to the first user in a recommendation list, whether the second user was recommended to the first user by a third user, etc.

In an aspect, context component 122 can determine or infer how, where, and/or why the first user found/provided contact information for the second user (such as a phone number or email address of the second user) in association with selection of the second user for sending a message. For example, the first user may have contact information for the second user in an existing personal contacts file/list. The contacts file/list can be stored in memory at the first user's client device $110_1$ employed by the first user to access server messaging platform 104 in association with sending the message. (e.g., the first user's phone contacts where client device $110_1$ is a phone). The contacts file/list can also be stored by content/service provider 102 in association with a user account the first user has with the content/service provider 102 (e.g. the first user's friends/acquaintances at the content/service provider 102), and/or an another source or system 118 accessible to client device $110_1$, (e.g. the first user's friends on an external social networking website or application). When requesting to send the message to the second user, the first user can select the recipient second user from the contacts file/list. Context component 122 can determine based on the input of contact information (e.g., phone number or email address) for the second user by the first user in the to: field of the message and the source from which the contact information was received (e.g., the first user's contacts list/file) that the first user already has the second user's contact information. The message sent to the second user would then include information indicating that the first user selected the second user from his contacts file/list. For example, the message could say "Adam (first user) found you (second user, Beth) because he had your phone number in his phone contacts," or "Adam found your profile because you are and Adam are friends at social networking source ABC."

For example, content/service provider 102 can include a new ridesharing service that uses a smartphone application to arrange rides between riders and drivers. A first user Adam may have downloaded the application and used the service and decided that his friend Beth should sign up too. Using the server messaging platform 104, Adam can send an invitation to his friend Beth from the ridesharing service that invites Beth to sign up for the service and download the application. When setting up the invitation, Adam can provide Beth's contact information (e.g., phone number or email) by selecting it from his contacts list/file (and/or typing it in from memory). When Beth receives the invitation in her email (or as a phone notification or text message depending on the contact information provided by Adam), the invitation will be from the ridesharing service but state that Adam suggested Beth sign up. In addition, the invitation can say that Adam found Beth because he had her contact information (e.g., phone number or email).

In another example, content/service provider 102 can include a video sharing service that provides streaming video to users and various social networking capabilities in association with video sharing. For instance, content/service provider 102 can allow users to send links to videos or other media items to one another and conduct chat (e.g., real time) or messaging (non-real time) session within one another via a messaging application enabled by server messaging platform 104. In accordance with this example, a first user of the content/service provider 102 can decide to chat with or otherwise message a second user using the messaging service afforded by messaging server platform 104 because it offers superior capabilities over other messaging mediums. For exemplary purposes, this messaging service is referred to as Media Messenger. For example, the first user (Adam) may want to discuss a party he is planning with the second user (Beth) using Media Messenger (over other messaging applications or mediums) because Media Messenger offers unique capabilities to include videos and/or media items within the chat messages in real-time. This messaging platform is ideal for Adam because he is interested in building a video playlist for the party and would like to share videos with Beth during the chat session.

Using Media Messenger, Adam can choose to invite Beth to chat via Media Messenger (e.g., at and/or using a messaging service provided by content/service provider 102) and provide contact information (e.g., phone number or email address) for Beth by selecting the contact information from his contacts file/list. Media Messenger (e.g., server messaging platform 104) is configured to send the invitation to the Beth using the contact information provided by Adam (e.g., as an SMS text message, a notification, an email, or a Media Messenger message where Beth is registered for and or logged on to Media Messenger). The message can include information identifying Adam (e.g., Adam's name or screen name, a picture or icon, etc.) and indicate that he would like to invite Beth to chat using Media Messenger. The message can also include context information indicating that Adam was able to message Beth because he already had her contact information (e.g., her phone number or email address). In an aspect, Beth may have never used Media Messenger before and thus receiving a message from Adam to join/employ a new messaging service may catch her off guard. By including context information in the message indicating that Adam was able to message her using and/or regarding using Media Messenger because he already had her phone number, Beth will be more inclined to trust the invitation and use Media Messenger to conduct the chat session. In an aspect, this would involve Beth registering for Media Messenger, such as setting up an account and/or downloading the Media Messenger client application (e.g., client messaging platform 112).

In another aspect, context component 122 can determine or infer how, where, and/or why the first user found/provided information identifying the second user in association with selection of the second user for sending a message. For example, the information identifying the second user can include but not limited to, the second user's name, screen/user name, profile, channel page, picture or icon. According to this aspect, the information identifying the second user can be tied to contact information for the second user (e.g., phone number, email address, etc.). This contact information can be visible or hidden from the first user depending on the source at which the second user identification information was provided.

According to this aspect, a first user (Adam) may find a profile and/or contact information for a second user (Beth) at a particular network source, such as a website or a webpage. The network source can include or be associated with content/service provider 102 (e.g., the website or application employed by the Adam to format and send the message). For example, the website or application could include a social networking website, a dating website, or a video sharing website wherein both the first and second user have existing profiles. In order to message the second user, the first user can select the second user's profile in association with initiating a messaging or connection request. Context component 122 is configured to determine the network source where the first user found the second user's profile/contact information and include this context information in the message that is sent to the second user.

For example, where content/service provider 102 is a media sharing service as described herein, a first user Adam may find a profile of a second user Beth while using the media sharing service. In an aspect, Adam may or may not also have a profile/account with the media sharing service. For example, Beth may have a channel established with the media sharing service via which she shares her personal videos. Adam can have somehow navigated to Beth's channel, whether it be in response to appearing in a search query initiated by Adam, watching a recommended video that was provided by Beth's channel, selecting a link to Beth's channel at another source 118 (e.g., a social network or an message from another user), selecting a link to Beth's channel within an advertisement, etc. According to this example, the media sharing service facilitates messaging other users by selecting a messaging link associated with the user's profile or information identifying the user. For example, Beth's channel page or profile page can include 'Connection' icon which upon selection, redirects the user to a messaging application via which the user can provide a message and send a message to Beth. In furtherance to the subject, example, Adam decides he would like to message Beth to talk about her channel and thus selects the 'Connection' icon on her channel page. Context component 122 can determine the specific network source/location (e.g., Beth's channel page) at which the request to send her the message was initiated and include this information in the message. For example, the message received by Beth can include information identifying Adam and indicate that Adam found Beth's profile on her channel page of the media sharing service.

In another aspect, a message including information regarding where (e.g., the network source) a first user found information identifying the second user can include additional information regarding how the first user found the second user's profile/contact information at the network source. For example, the first user may have found the second user's profile/contact information in association with a message response provided by the second user in a discussion forum at the network source. The message could thus indicate the first user found the second user's profile/contact information in association with the message response provided by the second user in the discussion forum at the network source. In another example, the first user may have found the second user's profile/contact information in response to watching a video provided by the second user and being directed to the second user's video channel at the network source. The message can further include this context information. In another example, a message can indicate the first user found the second user's profile/contact information in response to selection of a link to the second user's profile from a picture that included an image of the second user provided on another user's profile page. Still in yet another example, the first user may have been given the second user's profile/contact information from a third user, wherein the third user recommended the first user message the second user. The message can include information indicating this context.

In furtherance to the above example, context component 122 can determine a navigation path employed by Adam leading up to his request to connect with Beth via her channel page. For example, context component 122 can determine how Adam arrived at her channel page, other videos he may have watch on her channel page before messaging her, other channels and/or media items he accessed before coming to her channel page, etc. and include this context information in the message.

In another aspect, a user can find an instance of a user's profile or identity in association with their activity at the content/service provider 102. For example, depending on the nature of the content/service provider, a user's name/screen name, thumbnail image, icon, etc. can represent a user to denote their association with certain actions and affiliations at the content/service provider. According to this aspect, server messaging platform 104 can facilitate messaging the user in response to selection of the information identifying the user in association with a request to message the user. For example, Adam could find Beth's name and/or profile icon in association with a message provided by Beth in a messaging forum provided by the content/service provider 102. In another example, Adam could find Beth's name and/or profile icon in association with a picture, song, video, article, etc., she is tagged in. In another example, Adam could find Beth's name and/or profile icon in association with an award or recognition she received at the content/service provider or a review of her services (e.g., say she is a taxi driver for the car sharing services).

Context component 122 can also identify an association of a user profile with a group, category or even associated with content/service provider 102. For example, context component 122 can determine that Adam and Beth are united as 'friends' at the content/service provider 102 and/or that Adam selected Beth's profile from his list of friends at the content/service provider 102. This information can also be included in the message Beth receives from Adam. In another example, context component 122 can determine that Adam selected Beth's identification information in connection with inclusion of Beth's identification information in 'recommended users to get in touch with' section, in a 'top performers section,' in a 'new users section,' etc. This information can also be included in the message Beth receives from Adam.

In another aspect, first user Adam might find a person's profile, Beth or other identifying information for Beth, at a source remote 118 from content/service provider 102 and decide to message them using the server messaging platform 104 provided by content provider 102. For example, Beth's identification information at another application or website could include a link that provides various mechanism via which to message her such as via email, via text, via sending her a message at a first social networking account to which she belongs, a second social networking account to which she belong, a first messaging service to which she belong, a second messaging service to which she belong, etc. In accordance with this aspect, one option could include a request to send her a message via the server messaging service provided by content provider. In response to selection of this option, the other source 118 at which the option was selected can provide server messaging platform 104 with information identifying the source and/or network address at which the Beth's profile was selected. According to this aspect, server messaging platform 104 is configured to send the message to Beth with information identify the source/network location, remote from content/service provider 102, where Adam came across her profile and initiated the message request. In some aspects, additional information about the page at which Beth's profile was selected, such as content included on the page, comment's provided by Beth, etc., can be included as context information in the message generated and sent by server messaging platform 104. This additional information can be provided by the referring page to server messaging platform 104 and/or extracted by sever messaging platform 104 from the referring page's metadata.

In yet another aspect, a first user may receive information identifying a second user and/or contact information for the second user from a third user, a 'referring user.' For example, Adam's friend or acquaintance at content/server provider 102 may suggest he connect with Beth (whom Adam does not know), and provide Adam with a link to Beth's profile and/or contact information (e.g., via an email, text message, etc.). In another example, Beth's friend or acquaintance at content/server provider 102 may suggest Adam connect with Beth and provide Adam with a link to Beth's profile and/or contact information (e.g., via an email, text message, etc.). Still in yet another example, a person affiliated or not affiliated with Adam or Beth and/or affiliated or not affiliated with content/server provider 102 can send Adam a message/prompt with information identifying Beth and/or her contact information and suggest Adam connect with Beth. Context component 122 can determine whether a first user received information identifying the second user and/or contact user from a referring user and include this information in the message sent from the first user to the second user. For example, a message received by Beth could state: "Your friend Carly knows Adam and though the two of you should connect. Carly gave Adam your phone number."

Regardless of the context via which a first user (Adam) comes to find a second user's (Beth's) identification information, this context can be determined by context component 122 and included in the message that is sent to Beth. For example, context component 122 can extract and analyze Adam's navigation history with content/service provider 102 to determine the context via which he was prompted to send her a message. In another example, context component 122 can analyze metadata included in the referring page from which the messaging interface (e.g., that provides for messaging Beth) was launched in respond to a request, initiated by Adam, to message Beth. The metadata can be included in the referring page. This context information can be included in the message that Beth receives. For example, the message can indicate Adam found her profile in connection with her comment [insert comment] provided in messaging forum [insert messaging forum]. In another example, the message can indicate Adam found her profile in connection with a picture located at source [insert source here] in which she was tagged. In another example, the message can indicate Adam found her profile after reading review in an employee review section of the server messaging platform.

Figure 2:
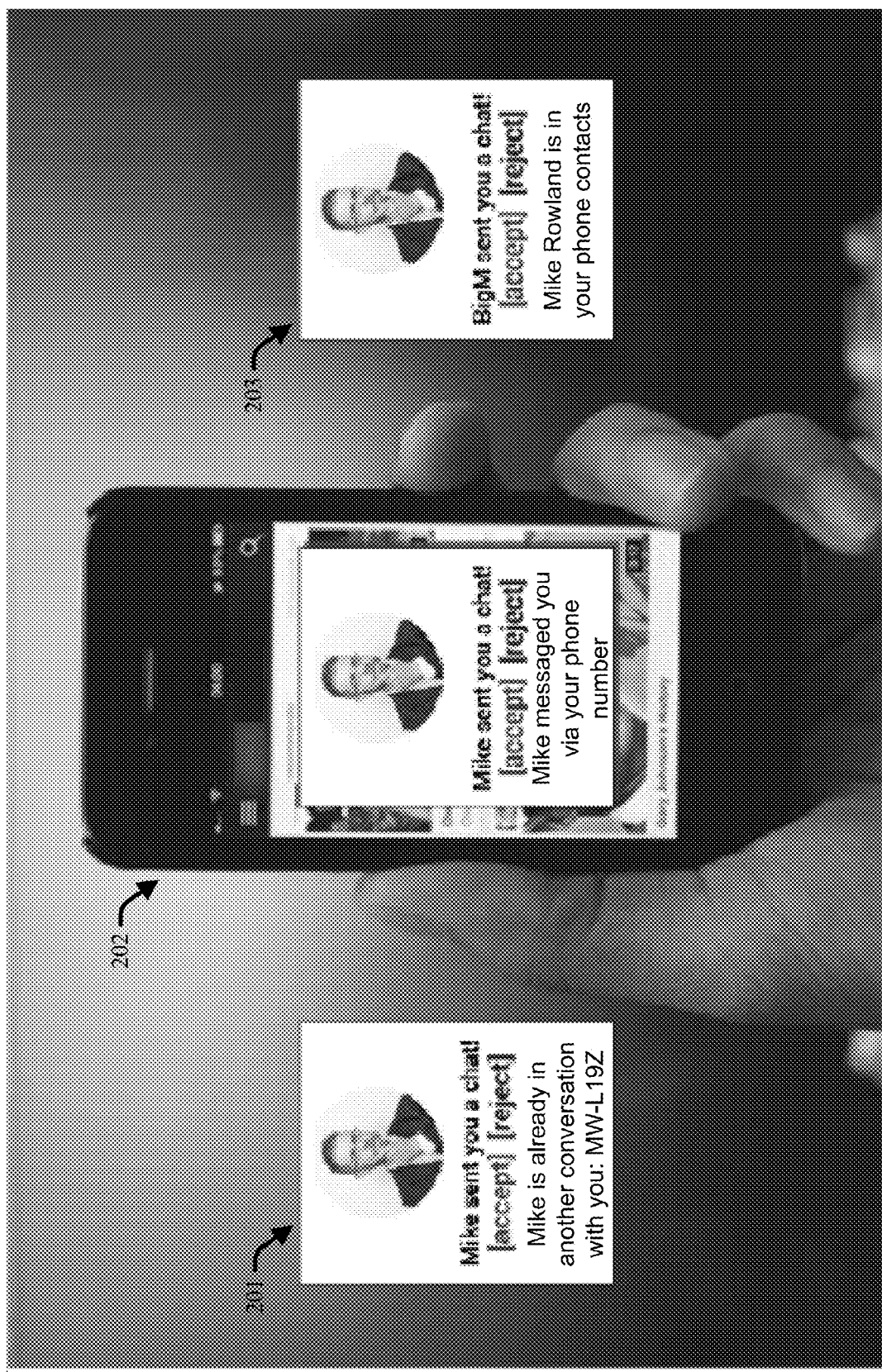
FIG. 2 presents example user interfaces displaying a contextual conversation invitation in accordance with various aspects and embodiments described herein.

FIG. 2 presents example contextual conversation invitations for display at a client device (e.g., a smartphone) of a recipient user in accordance with various aspects and embodiments described herein. In an aspect, the contextual conversation invitations were generated and sent via system 100, wherein the content/server provider 102 is a streaming media provider that provides the media messaging service 'Media Messenger' in accordance with the examples described herein. The mobile phone device depicted in FIG. 2 is the client device (e.g., client device 110$_2$), of the contextual conversation invitation recipient user named Donna. The message sender, Mike, accessed and/or employed content/server provider's messaging platform 104 Media Messenger via his client device (e.g., client device 110$_1$) to send Donna one of the contextual conversation invitations 201, 202 or 203 depicted in FIG. 2. In an aspect, Mike employed a client application for Media Messenger (e.g., client messaging platform 112) on his client device to facilitate generating and sending the contextual conversation invitation.

Each of the contextual conversation invitations 201, 202 and 203 invite Donna to chat with Mike (e.g., using Media Messenger) and include context information, determined by context component 122, regarding how Mike was able to contact Donna to send her the invitation. For example, contextual conversation invitation 201 to Donna states that "Mike is already in another conversation with you: MW-L19Z." In accordance with this example, Mike is and/or was conducting another conversation and/or messaging session with Donna. This other conversation could include another chat session or messaging session, such as a group chat session or message forum, between Mike, Donna, and other users, via Media Messenger, identified as conversation MW-L19Z. This conversation could also include another message session between Mike, Donna and/or one or more other users using a different messaging application. According to this example, Mike can have selected Donna based on her identification information (e.g., user name) and/or contact information rendered to Mike in association with the other conversation identified as conversation MW-L19Z.

Contextual conversation invitation 202 to Donna states that "Mike messaged you via your phone number." In accordance with this example, Mike can have selected Donna by importing her phone number into the message request from his personal contacts provided on his client device or at another accessible source. In another aspect, Mike may have known Donna's phone number from memory and typed in her phone number in association with the message request. Contextual conversation 203 to Donna states that "Mike Rowland is in your phone contacts." In accordance with this example, similar to invitation 202, Mike can have selected Donna by importing her phone number into the message request from his personal contacts file or by typing it into the message request from memory. However, rather than displaying message 202, context component 122 (and/or another component of system 100 provided at server messaging platform 104 and/or a client messaging platform 112 of Donna's client device) is able to determine that Mike is also in Donna's contacts. Based on a determination that Donna already has Mike in her contacts, context component 122 can include this context information in the contextual conversation.

In addition, as discussed infra, invitations in some cases add an extra identity for the sender. For example, if the sender appears in the recipient's phone contacts then the sender can be identified by the name that appears in the recipient's phone contacts. This feature is exemplified in contextual conversation invitation 203 wherein Mike is identified as Mike Rowland. In particular, based on information identifying Mike and/or Mike's contact information used to send the invitation and Donna's personal contacts file (e.g., provided at her client device or another source accessible to context component 122), context component 122 can find other information identifying Mike to Donna. For example, Donna can have Mike listed in her contacts in association with his phone number (which was used to send the invitation) as Mike Rowland. Thus rather than displaying the invitation to Donna as being from Mike, the invitation can be displayed to Donna from a name she use's to refer to Mike, Mike Rowland.

Figure 3:
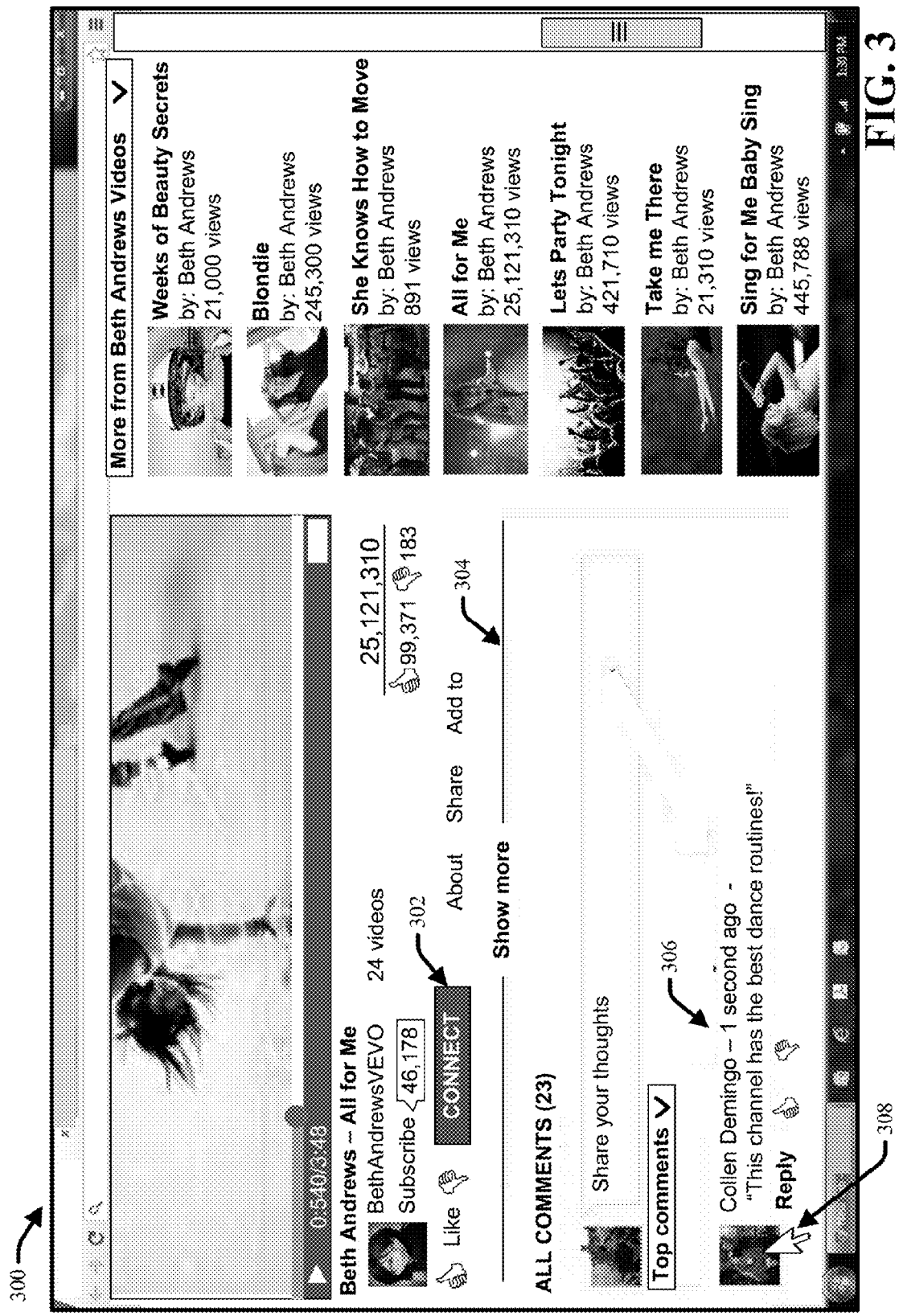
FIG. 3 presents an example user interface of a navigation page that includes a connection link to facilitate generating a contextual invitation with context information based on the navigation page in accordance with various aspects and embodiments described herein.

FIG. 3 presents an example user interface 300 that includes a connection link to facilitate generating a contextual invitation based on selection of information identifying a recipient user from a network location corresponding to the interface, in accordance with various aspects and embodiments described herein. The interface depicted in FIG. 300 includes a channel webpage for a user Beth Andrews. In an aspect, Beth Andrews' channel page is established and hosted by content/service provider 102, wherein content/service provider 102 is a streaming media provider. Other user's can visit her channel page when accessing the streaming media provider to view Beth's videos, provide comments about her channel/videos, subscribe to her channel, review her channel, etc.

In an aspect, other users can choose to connect with Beth Andrews using connection link 302. For example, in response to selection of the connection link, a messaging application employed by the streaming media provider (e.g., server messaging platform 104) is launched and displayed to the user that selected the link. The messaging application allows the user to send Beth a message. For instance the message could include an email, a text message, a request to chat via a chatting service (e.g., Media Messenger) provided by the streaming media provider, etc. The from: field of the message is populated with information identifying the sender and the to: field is automatically populated to be sent to Beth Andrews. Contact information for Beth can remain hidden to the sender. The manner via which the message is sent to Beth (e.g., as a text message, as an email, as a Media Messenger chat invite), can be determined in part by the sender, restrictions/requirements defined by Beth, and/or the streaming media provider. However, the context component 122 associated with the messaging application can determine that the message to be sent to Beth was initiated in response to selection of the connection link 302 directly from Beth's channel page. Accordingly, context component 122 can include context information in the message informing Beth that the sender found Beth from her contact page.

Beth's channel page also includes a comment section 304 at which other user's can post and comments. For example, a user Colleen Demingo has posted a comment 306 in the comment section. Colleen Demingo is identified in association with her comment via a thumbnail icon 308 chosen to represent Colleen. In an aspect, another user can select Colleen's comment, thumbnail icon 308 and/or name directly from Beth's channel page to launch a flow of events that leads to launching of the messaging application so to that the other user can send Colleen a message. Similarly, the context component 122 associated with the messaging application can determine that the message to be sent to Colleen was initiated in response to selection of her comment, thumbnail icon 308 and/or name directly from Beth's channel page. Accordingly, context component 122 can include context information in the message informing Colleen that the sender found her from her comment on Beth Andrews channel page.

Figure 4:
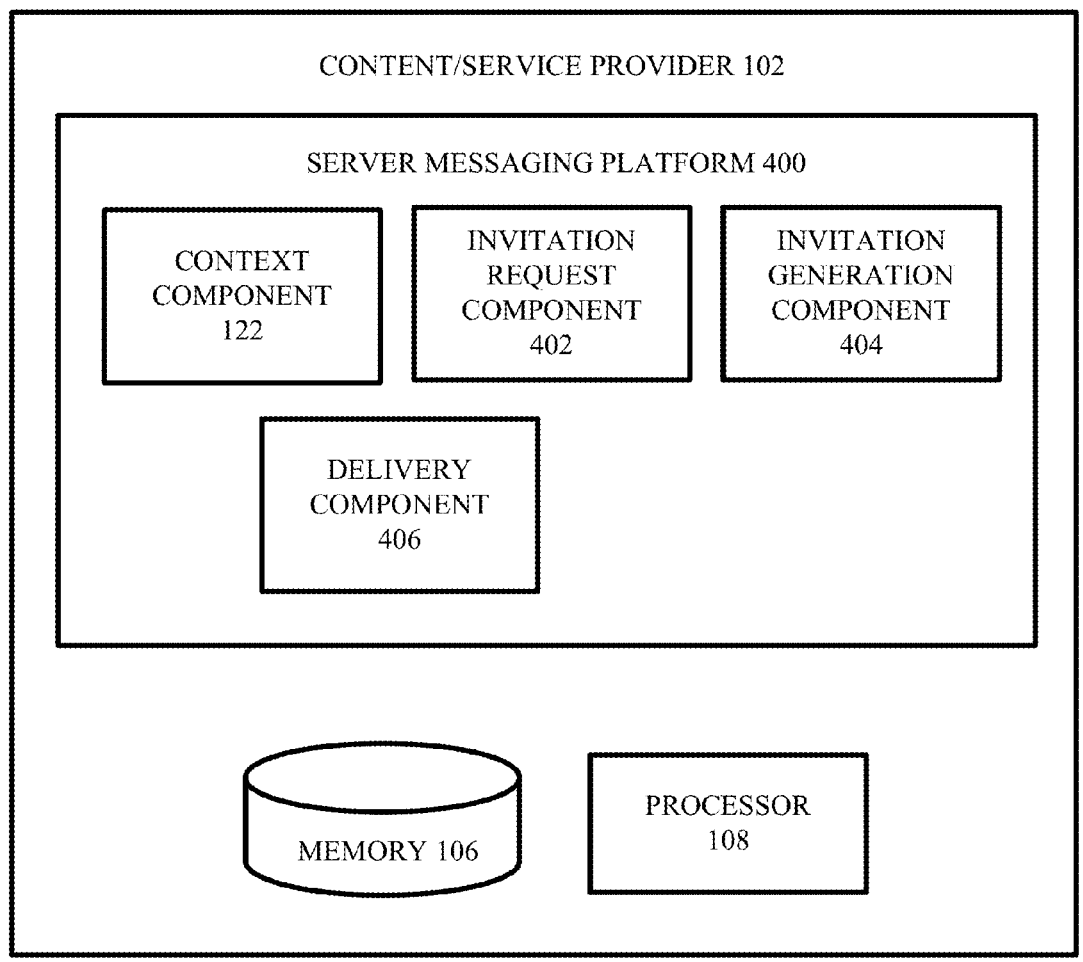
FIG. 4 presents an example content/service provider that facilitates generating and providing an invitation from a first user to connect with a second user that identifies a context regarding how or where the first user found the second user, in accordance with various aspects and embodiments described herein.

FIG. 4 presents another example server messaging platform 400 for employment by content/service provider 102 to facilitate generating and sending contextual messages in accordance with various aspects and embodiments described herein. Server messaging platform 400 includes same or similar features as server messaging platform 104 with the addition of invitation request component 402, invitation generation component 404 and delivery component 406. Repetitive description of like elements depicted in example systems and devices described herein is omitted for sake of brevity.

In accordance with an embodiment, server messaging platform 400 can include invitation request component 402, invitation generation component 404 and deliver component 406 to facilitate generating and sending messages including context information regarding how and/or where the sender found information identifying the recipient and/or contact information for the recipient. Invitation request component 402 is configured to receive requests from users of content/service provider 102 (and server messaging platform 400) to send a message to another user. For example, the message can include an invitation sent to another user inviting them to join (e.g., establish an account with, download the client side application for, etc.) content/server provider 102. In another example, the message can include an invitation sent from a first user to a second user inviting the second user to connect with the first user at the content/service provider 102. For instance, the first user could invite the second user chat a messaging service provided by content/service provider 102.

Requests received by invitation request component 402 will include information identifying a second user (the recipient) that the first user (the sender) has selected to send the invitation to and/or contact information for the second user. In an aspect, the information identifying the second user is received by invitation request component 402 in association with the request in response to selection of the information by the first user. For example, the first user could select a profile for the second user, a name or username of the second user, an image representing the second user, an icon representing the second user, etc. This information identifying the second user can be linked to contact information for the second user (e.g., a phone number or email address) and accessed by or provided to server messaging platform in association with selection of the information identifying the second user. In another aspect, the information identifying the second user (e.g., name, user name, profile, image, etc.) is received by invitation request component 402 in association with the request in response to selection of a 'connection' or 'messaging' link associated with the information identifying the second user. For example, a connection or messaging link provided on the second user's profile page, webpage, or other network source affiliated with the second user. Selection of this connection or messaging link can launch a messaging application provided by server messaging platform 400 wherein the to: field of a message to be sent is automatically populated with information for the second user (e.g., the second user's name and/contact information). According to this aspect, the second user's name and/or contact information can be hidden from the first user yet accessible and determinable by server messaging platform based on the network location where the connection or messaging link was selected and/or the information identifying the second user that is associated with the selected connection/messaging link.

In yet another aspect, contact information for the second user is provided/received in association with the request from the first user. For example, in association with making the request, the first user could enter the second user's contact information (e.g., from memory) and/or import the second user's contact information from a personal contacts file/list (e.g., selected from the first user's contacts).

As described supra, context component 122 is configured to determine a context regarding selection of the second user by the first user. For example, context component 122 can determine or infer where the first user found information identifying the second user, such as a particular network source/location (e.g., the second user's channel at source A, the second user's profile at source B, etc. According to this example, the context regarding selection of the second user by the first user can include the network source/location where the first user found the information identifying the second user that led to initiation of the request.

In another example, the invitation request component 402 can receive information identifying the second user (e.g., the second user's name, profile name, profile, image, etc.) in response to selection of the information from social contacts information identifying users that are social contacts of the first user at content/service provider 102 or another network source 118. According to this example, the context, as determined via context component 122, under which the first user selected the second user will indicate that the first user found the second user in the first user's social contacts information for the content/service provider 102 or another network source 118.

In another example, the invitation request component 402 can receive information identifying the second user (e.g., the second user's name, profile name, profile, image, etc.) in response to selection of an instance of a profile of the second user provided at the content/service provider 102 (or another network source 118) in association with a content item provided by the content/service provider 102 (or the other network source 118) According to this example, the context, as determined via context component 122, under which the first user selected the second user will include where the first user found the instance of the second user's profile and the content item.

In yet another example, the invitation request component 402 can receive information identifying the second user (e.g., the second user's name, profile name, profile, image, etc.) in response to selection of an instance of a profile of the second user provided at the content/service provider 102 (or another network source 118) in association with a comment provided by the second user at the content/service provider 102 (or the other network source 118) According to this example, the context, as determined via context component 122, under which the first user selected the second user will include where the first user found the comment and refer to the comment.

In yet another example, the invitation request component 402 can receive information identifying the second user (e.g., the second user's name, profile name, profile, image, etc.) in response to selection of connection request link provided a network page (e.g., webpage, channel page, profile page, etc.) associated with the second user at the content/service provider 102 (or the other network source 118) According to this example, the context, as determined via context component 122, under which the first user selected the second user will include indicates the first user found the second user via the second user's network page (e.g., webpage, channel page, profile page, etc.).

Still in yet another example, context component 122 can determine or infer that the first user had and/or provided the second user's contact information (e.g., based on importation or extraction from the first user's personal contacts file). According to this example, the information identifying the second user could include the second user's contact information. For example, when the invitation request component 402 receives information identifying the second user (e.g., name and/or contact information) in response to selection of the information by the first user from contacts information stored in memory on a device employed by the first user to access the content/service provider 102, the context regarding selection of the second user by the first user, as determined by context component 122, will indicate that the first user found the second user in the first user's contacts information.

Invitation generation component 404 is configured to generate/configure the actual message to be sent from the first user to the second user. The message will include first user identification information (e.g., information identifying the first user, such as a name, username, phone number, image, icon, etc.) and context information identifying the context regarding the selection of the second user by the first user. For example, invitation generation component 404 can generate an invitation that invites the second user to connect with the first user at the content/service provider (or via a messaging application provided by the content/service provider), with information indicating how the first user found the second user's contact information (e.g., either directly or indirectly via a profile of the second user).

Delivery component 406 is configured to send the message or invitation to the second user. In an aspect, when contact information for the second user is not directly provided by the first user, delivery component 406 can determine contact information for the second user based on information provided by the first user identifying the second user. For example, delivery component can identifying an email address or phone number linked to the second user's name, username, profile, image, icon, etc. Delivery component 406 can then deliver the message to the second user using the identified contact information.

Figure 5:
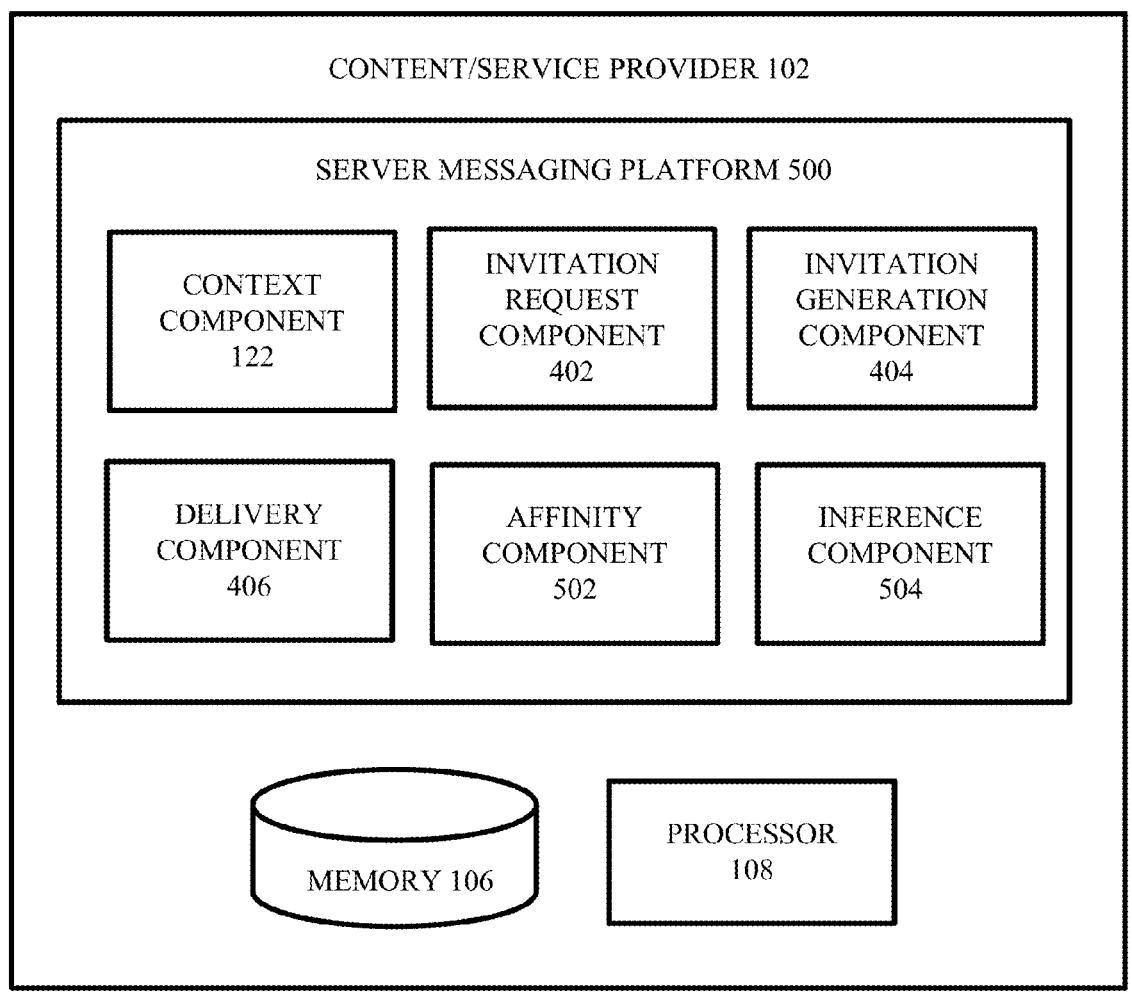
FIG. 5 presents another example content/service provider that facilitates generating and providing an invitation from a first user to connect with a second user that identifies a context regarding how or where the first user found the second user, in accordance with various aspects and embodiments described herein.

FIG. 5 presents another example server messaging platform 500 for employment by content/service provider 102 to facilitate generating and sending contextual messages in accordance with various aspects and embodiments described herein. Server messaging platform 500 includes same or similar features as server messaging platform 400 with the addition of affinity component 502 and inference component 504. Repetitive description of like elements depicted in example systems and devices described herein is omitted for sake of brevity.

As previously discussed, context component 122 is configured to determine how and/or where a first user (the sender, Adam) came to select a second user (the recipient, Beth), for sending a message or invitation. Affinity component 502 is configured to determine or infer additional information relating sender and recipient of a contextual message, particularly how the recipient knows and/or is affiliated with the sender or vice versa For example, in association with establishing various online identities/profiles, users can publically associate a variety of traits and/or attributes about themselves with their profile, such as but not limited to, their demographic information, their preferences and opinions regarding various goods, services, and content items available at various network sources 118, their employment history, their educational history, their relationship status, their hobbies, their habits, their religious beliefs, their family, etc. In another example, users can publicize their social affiliations, such as who they are friends/associated with on various social networks, who's listed in their phone/email contacts, etc. Information regarding a user's relationship with certain users can also be publicized or discerned such as but not limited to, a type of their relationship (college friend, sister, cousin, wife, coworker, etc.), where the users met, how long they have known each other, how often they communicate, etc.

Further, users can link or authorize association of their virtual and/or traceable real world activity to their profile's or online presences. For example, a user can link his or her online purchases, online browsing history, travel and event plans (e.g., based on booking online), videos watched via a video streaming service (e.g., based on video watch history), or content item (e.g., videos, channels, articles, user comments, etc.) endorsement history (e.g., via liking, favoriting, sharing commenting on, subscribing to, following, etc.). In another example, users can publicize information regarding their current real-world location, who they are with and what they are doing.

In an aspect, affinity component 502 is configured to gather and/or access a variety of available information about both the sender and the recipient regarding their traits and/or attributes, their social affiliations/circles, and/or their virtual and real-world activity. Affinity component 502 further compares information gathered for both the sender and the recipient to determine various commonalities between them. For example, affinity component 502 can determine common traits/attributes shared between the sender and the recipient, such as shared video preferences and opinions and shared channel subscriptions. Invitation generation component 404 can then include this information in the message sent from the first user (Adam) to the second user (Beth).

In another example, affinity component 502 can compare social circles of the respective users to determine whether and how they overlap, such as friends they have in common. According to this example, affinity component 502 can analyze social graph information for both the sender and the recipient to determine a score regarding a degree to which their social graphs overlap. Invitation generation component 404 can further include information in a message identifying one or more acquaintances/friends the sender and recipient have in common and/or the score reflecting the degree to which their respective social circles overlap. For example, affinity component 502 can determine that the sender and recipient's children attend the same school or are on the same soccer team. In an aspect, affinity component 502 can place greater weight on users included in their respective social graphs who are considered to have a closer/stronger relationship with the sender and recipient, respectively (e.g., users that are family, users that have been friends for a long time, users that are frequently communicated with, frequently seen/spent time with in person, etc.).

In another example, affinity component 502 can compare virtual and/or real world activity of the sender and the recipient to determine aspects they have in common. Information regarding aspects of their virtual and/or real world activity that the respective users have in common can further be included in the message. For example, affinity component 502 can determine where the two users are located at the time the message is sent and whether they are within proximity of one another. In another example, affinity component 502 can determine that the two users attended or are attending the same event or watched or are watching the same video online. In another example, affinity component 502 can determine that the two users schedules overlap and how. For instance, affinity component 502 can determine that the sender and the recipient often go to the same gym or coffee shop around the same time on the weekends. In another example, affinity component 502 can determine that the two users have signed up for a same future event (e.g., a concert, a party, a class) or that the two users will be traveling to the same place for vacation.

Affinity component 502 can also identify discrepancies between attributes, social circles, and/or virtual and real world activity between the sender and the recipient. For example, the respective users may few or no traits/characteristics in common or low or no social graph correspondence. In another example, the respective users may live in different parts of the world and/or share little or no virtual and/or real word experiences. In this scenario, invitation generation component 404 can also include information in the message indicating the two users have little or nothing in common, thus forewarning the recipient that the sender may not be trustworthy. Invitation generation component 404 can further highlight suspicious discrepancies, such as the users living in different parts of the word and/or having no friends in common.

In another aspect, affinity component 502 can determine whether the sender and the recipient have met before (e.g., in person or in the virtual world), where, and under what context. For example, based on the users virtual and/or real world activity, affinity component 502 can determine whether the two users attended the same event or chatted together in a same chat room. Affinity component 502 can also correlate overlapping activity with a point in time when the two users became friends/acquaintances online and/or exchanged contact information with one another. For example, affinity component 502 can determine that the sender and the recipient became friends on a particular social network after chatting in the same chat room on Jan. 12, 2014 regarding their opinions of a certain music video. In another example, affinity component 502 can determine that the sender and the recipient exchanged contact information while attending a cocktail party at a certain venue on a certain date. Invitation generation component 404 can further include context information in an message indicating whether the sender and the recipient have met before, where, and under what context.

For example, when a first user receives a second persons contact information, metadata can be associated with the contact information and/or a profile for the first user regarding circumstances at the time of reception. For example, the contact information can be time stamped and geotagged with a location of the first user or the second user at the time of reception of the contact information by the first user. According to this example, when the second user receives a message from the first user, invitation generation 404 can include context information in the message indicating that the first user had the second user's contact information and received the second user's contact information on a certain date while the first user and/or the second user were at a particular location.

In another aspect, affinity component 502 is configured to determine whether the recipient of a message has contact information for the sender, whether it be included in a contacts file on the second user's device or otherwise associated with a profile/online identify of the user. Affinity component 502 can further determine other identification information for sender based on his contact information (e.g., phone number or email address) as held by the recipient, such as another name or title the second user associates with the sender or a picture/icon the second user associates with the sender. For example, affinity component 502 can discern that a phone number for a user with the user name 'Adamapplepicker15' corresponds to Adam Slepecky as provided in the second user's contacts file. According to this example, affinity component 502 can extract the other identification information for 'Adamapplepicker15', the name Adam Slepecky and invitation generation component 404 can include this other identification information for the sender in the message. For example, rather than the message indicating "Adamapplepicker15 want sot chat," the message can state "Adam Slepecky wants to chat."

Inference component 504 is configured to provide for or aid in various inferences or determinations associated with aspects of server messaging platform 500. For example, inference component 504 can facilitate context component 122 with inferring a context under which the message sender came to select the message recipient. For instance, inference component 504 can infer where (e.g., network location) and how (e.g., selection of a profile, input of contact information from file stored on first user's device, etc.) the first user provided contact information and/or information identifying the recipient. In another example, affinity component 502 can employ inference component 504 to infer additional information regarding how the sender is related to the recipient or vice versa. For example, inference component 504 can infer where the sender and the recipient met before, whether it me in the virtual world (e.g., in a chat room, playing a video game, commenting on the same channel, etc.) or the real world (e.g., at a cocktail party, in a coffee shop), and the circumstances regarding their meeting (e.g., time, place, events associated therewith, other people associated therewith, etc.).

In order to provide for or aid in the numerous inferences described herein, inference component 504 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
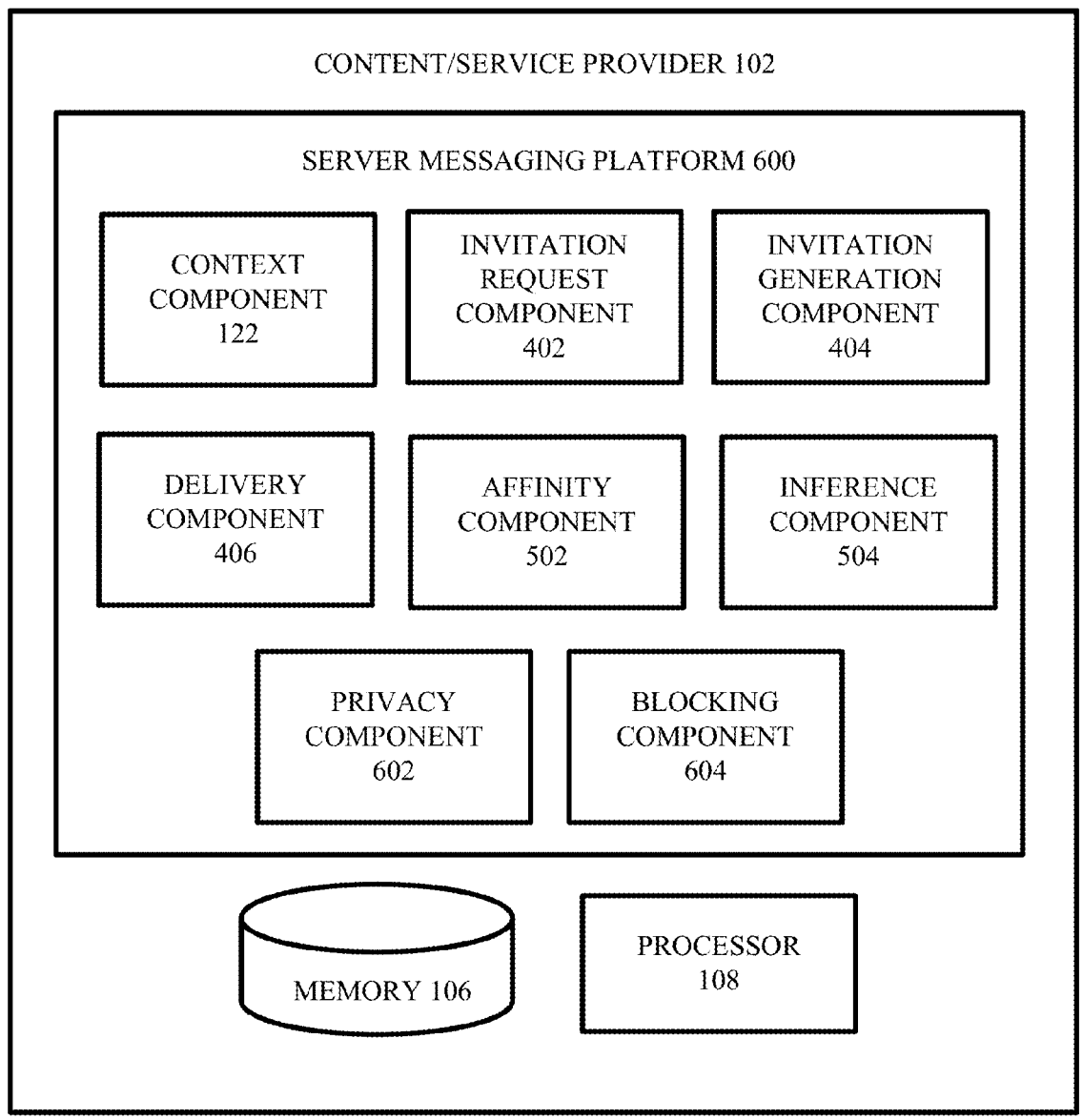
FIG. 6 presents an example content/service provider that facilitates generating and providing an invitation from a first user to connect with a second user that identifies a context regarding how or where the first user found the second user, in accordance with various aspects and embodiments described herein.

FIG. 6 presents another example server messaging platform 600 for employment by content/service provider 102 to facilitate generating and sending contextual messages in accordance with various aspects and embodiments described herein. Server messaging platform 600 includes same or similar features as server messaging platform 500 with the addition of privacy component 602 and blocking component 604. Repetitive description of like elements depicted in example systems and devices described herein is omitted for sake of brevity.

In an embodiment, server messaging platform 600 provides a messaging application for users of content/service provider 102 wherein registered users can communicate with one another (e.g., via emailing, instant messaging, multimedia messaging, etc.). In accordance with this embodiment, the registered users of content service/provider 102 and/or the messaging application can set privacy settings (in association with their account or profile) restricting contexts via which other users can message them. Blocking component 604 is configured to determine whether a sender is authorized to send a message to a recipient based on the recipient's privacy settings and the context via which the sender came to select the recipient (e.g., the context via which the sender provided information identifying the recipient and/or the recipients contact information). In response to a sender failing to meet a recipients privacy settings, blocking component 604 will prevent the sender from messaging the recipient and/or prevent the message from being sent to the recipient.

For example, a user can restrict reception of messages via server messaging platform 600 to users that are friends of the user at content/service provider 102. In another example, a user can restrict reception of messages via server messaging platform 600 to users that are associated with the user at content/service provider 102 and a defined set of other social networks. In another example, a user can restrict reception of messages via server messaging platform 600 to users that have the user's phone number or email address (e.g., including a specific phone number and a specific email address). In another example, a user can restrict reception of messages via server messaging platform 600 to users that select their profile from a specific network location (e.g., their channel page, their blog, or in response to a comment the user has provided, etc.).

In other aspects, a user can restrict reception of messages via server messaging platform based on other factors relating the user to the sender and vice versa. For example, a user can restrict reception of messages via server messaging platform 600 to users that have a degree of social circle overlap above a threshold degree. In another example, a user can restrict reception of messages via server messaging platform 600 to users that are share a common trait or attribute with the user, such as a common preference or subscription. In another example, a user can restrict reception of messages via server messaging platform 600 to users that are the user has met before online, met before in person, met within the past X timeframe, met at a certain location, etc.

In another example, content/service provider 102 can include a video sharing service that provides streaming video to users and various social networking capabilities in association with video sharing. For instance, content/service provider 102 can allow users to send links to videos or other media items to one another and conduct chat (e.g., real time) or messaging (non-real time) session within one another via a messaging application enabled by server messaging platform 104. In accordance with this example, a first user of the content/service provider 102 can decide to chat with or otherwise message a second user using the messaging service afforded by messaging server platform 104 because it offers superior capabilities over other messaging mediums. For exemplary purposes, this messaging service is referred to as Media Messenger.

Figure 7:
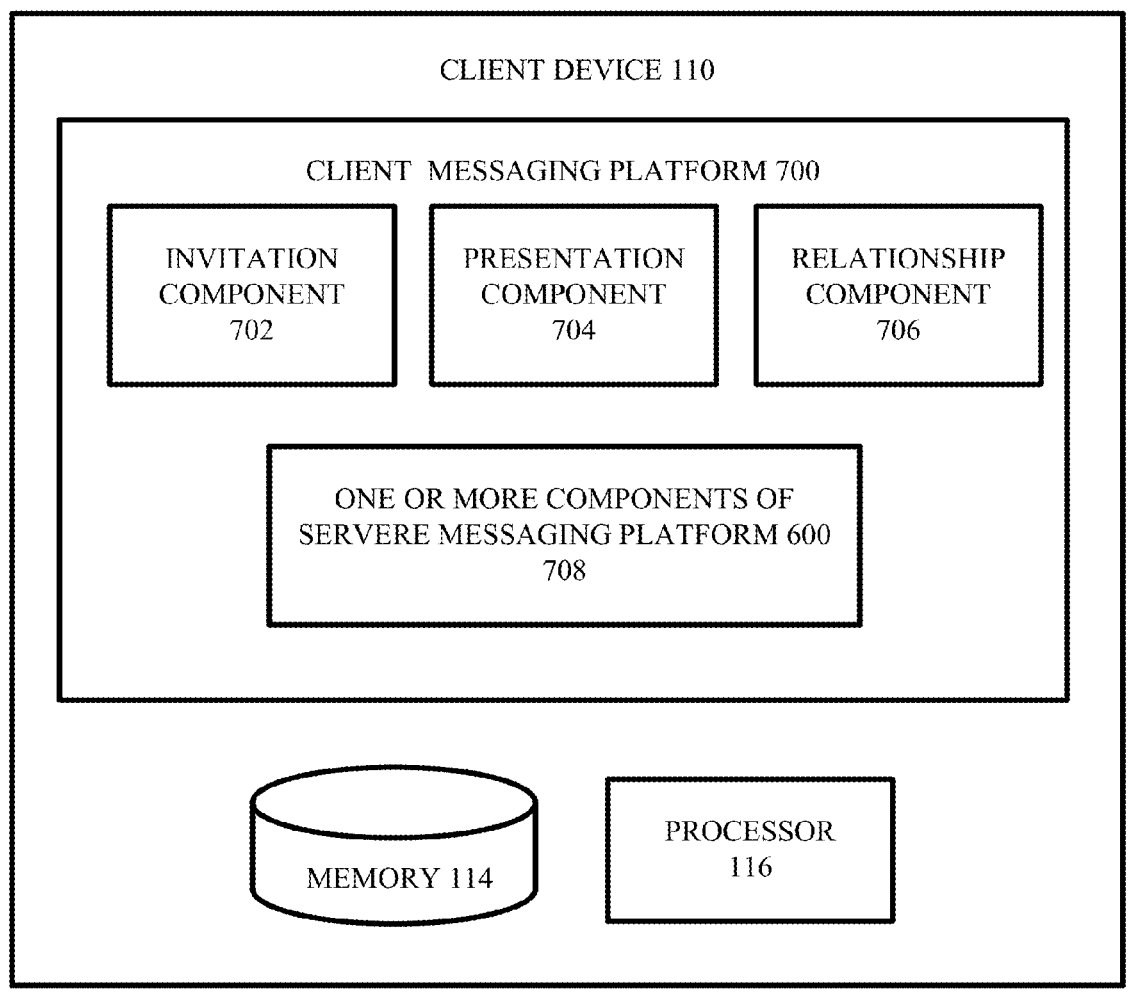
FIG. 7 presents an example client device that facilitates receiving and responding to an invitation from a first user to connect with a second user that identifies a context regarding how or where the first user found the second user, in accordance with various aspects and embodiments described herein.

FIG. 7 presents an example client messaging platform 700 for employment at a client device 110 to facilitate receiving, and potentially generating and sending, contextual messages in accordance with various aspects and embodiments described herein. Client messaging platform 700 can include same or similar features and functionality as client messaging platform 112. Repetitive description of like elements depicted in example systems and devices described herein is omitted for sake of brevity.

Client messaging platform 700 facilitates receiving, responding to, and potentially generating and sending contextual messages. In an aspect, invitation component 702 is configured to receive context messages from content/service provided and/or server messaging platform 600 and the like directed to a user of client device 110. For example, invitation component 702 can receive an invitation that invites a user of client device 110 to connect with another user first via a messaging application of the content/service provider 102. As discussed herein, the invitation will include first user identification information and context information identifying a context regarding the selection of the user of client device 110 by the other user, including where the first user found information identifying the second user. Presentation component 704 is configured generate a graphical user interface comprising the invitation for display to the user of client device 110. For example, presentation component 704 can generate and present the context messages 201, 202 and 203 depicted in FIG. 2.

Client messaging platform 700 can also include relationship component 706. In an aspect, relationship component can identify, based on information identifying the sender in a received message and/or contact information for the sender, whether the user of client device 110 has other identification information for the sender. For example, relationship component 706 can determine whether the user of client device 110 has contact information for the sender (e.g., stored in memory 114 at client device 110) and/or whether the user of client device 114 associates other information identifying the first user with his contact information, such as a different name, title, image/icon, etc. In response to identification of other identification information associated with the sender by the user of client device 110, relationship component 706 can update/change the message to reflect or include this other identification information for the sender.

In an aspect, client messaging platform 700 is a client messaging application configured to employ messaging services afforded by server messaging platform 600 and the like. According to this aspect, client messaging platform 700 can include one or more components 708 of server messaging platform 600 for deployment on the client end and server messaging platform 600 can function as the application service provider. For example, client messaging platform 600 can include an invitation request component 402 via which users of the client application can make requests to send messages to other users. Client messaging platform 600 can also include a context component 122 that can determine a context via which the user selected a recipient via a context message, and an invitation generation component 404 configured to generated the context message. Client messaging platform 700 can employ server messaging platform 600 to facilitate actual sending/delivery of the message to the receiving user via a network.

In accordance with this aspect, in response to reception of a context message be invitation component 702, the user of client device can either accept or rejected the invitation. For example, the context messages 201, 202 and 203 respectively include an option to accept or reject the invitation to chat with Mike. In an aspect, in response to acceptance or rejection of the invitation by the recipient user of client device 110, a privacy component 602 included in the client application can provide the user with a request/prompt to implement a privacy setting that restricts a context regarding provision, by the content/server provider 102, of future invitations to the user of client device 110 via the client application. For example, the user of client device 110 can choose not to receive other messages from user's who selected the user of client device from an instance of his profile at a particular network location. Selected privacy settings can be associated with the client application to block incoming messages that do not conform with his privacy settings and/or to prevent sending of messages, from content/service provider 102, to the client application that do not conform.

Figure 8:
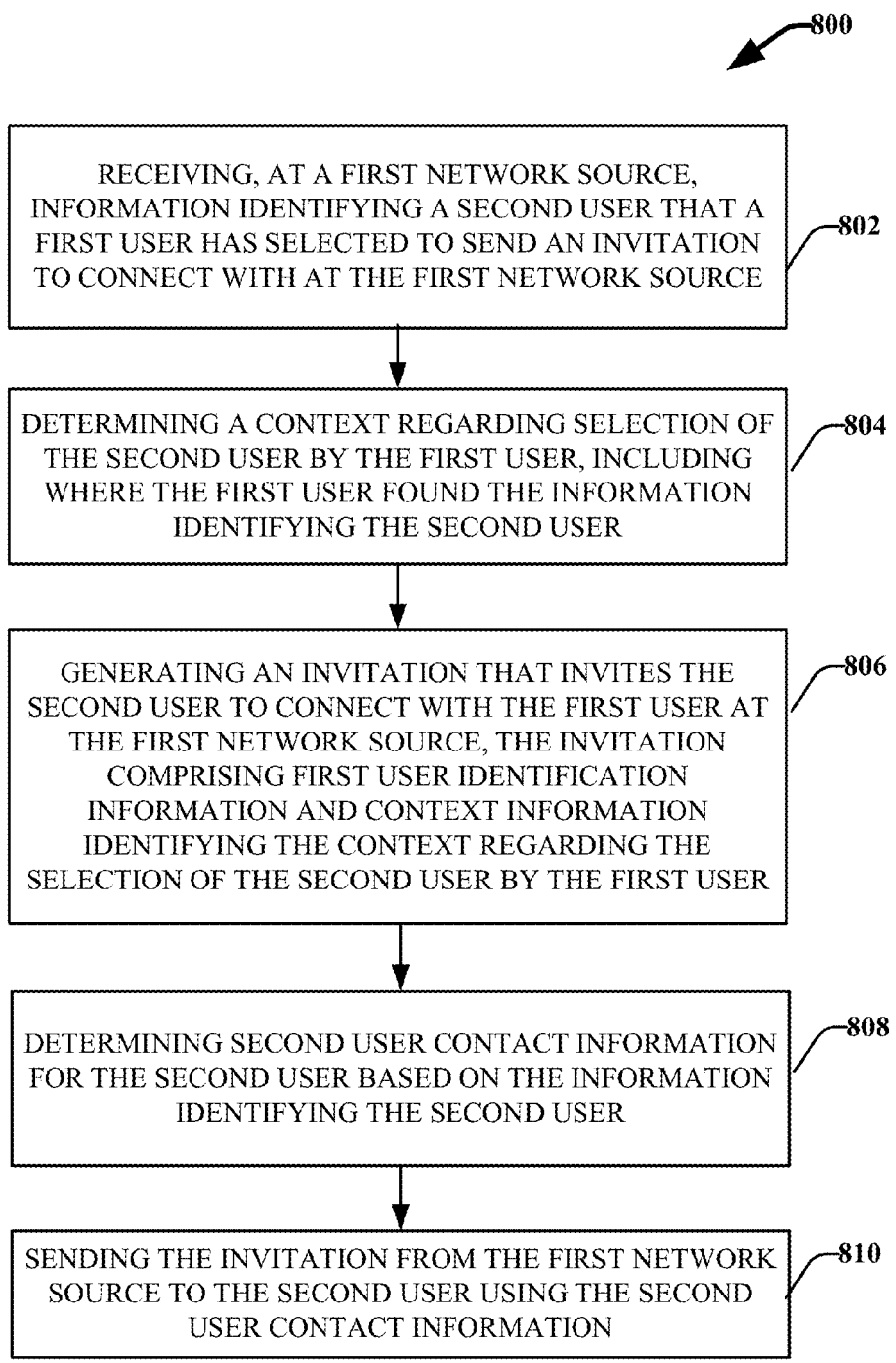
FIG. 8 presents an example method for generating and providing an invitation from a first user to connect with a second user that identifies a context regarding how or where the first user found the second user, in accordance with various aspects and embodiments described herein.
Figure 9:
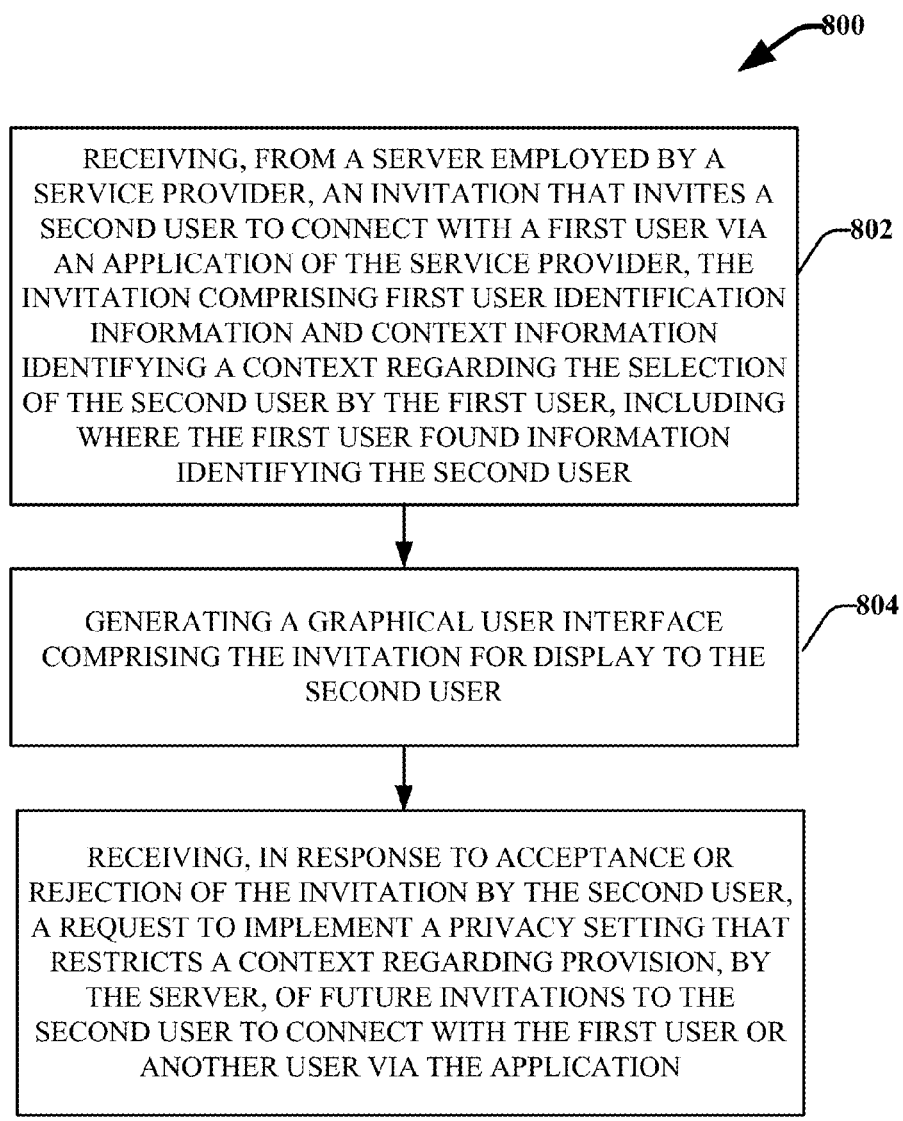
FIG. 9 presents another example method for generating and providing an invitation from a first user to connect with a second user that identifies a context regarding how or where the first user found the second user, in accordance with various aspects and embodiments described herein.

In view of the example systems and/or devices described herein, example methods that can be implemented in accordance with the disclosed subject matter can be further appreciated with reference to flowcharts in FIGS. 8-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method for including information in an invitation from a first to connect with a second user that identifies a context regarding how the first user found the second user in accordance with aspects described herein. At 802, information is received, at a first network source, identifying a second user that a first user has selected to send an invitation to connect with at the first network source (e.g., via invitation request component 402). At 804, a context regarding selection of the second user by the first user is determined (e.g., via context component 122). For example, this context can include where the first user found the information identifying the second user. At 806, an invitation that invites the second user to connect with the first user at the first network source is generated (e.g., via invitation generation component 404). The invitation includes first user identification information and context information identifying the context regarding the selection of the second user by the first user. At 808, contact information for the second user is determined based on the information identifying the second user (e.g., via context component 122 and/or in delivery component 406). At 810, the invitation is then sent from the first network source to the second user using the second user contact information (e.g., via delivery component 406).

FIG. 9 illustrates a flow chart of an example method for including information in an invitation from a first to connect with a second user that identifies a context regarding how the first user found the second user in accordance with aspects described herein. At 902, an invitation is received, from a server employed by a service provider, that invites a second user to connect with a first user via an application of the service provider (e.g., via invitation component 702). The invitation includes first user identification information and context information identifying a context regarding the selection of the second user by the first user, including where the first user found information identifying the second user. At 904, a graphical user interface is generated having the invitation for display to the second user (e.g., via presentation component 704). At 906, in response to acceptance or rejection of the invitation by the second user, a request is received and presented to the second user to implement a privacy setting that restricts a context regarding provision, by the server, of future invitations to the second user to connect with the first user or another user via the application (e.g., via privacy component 602).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
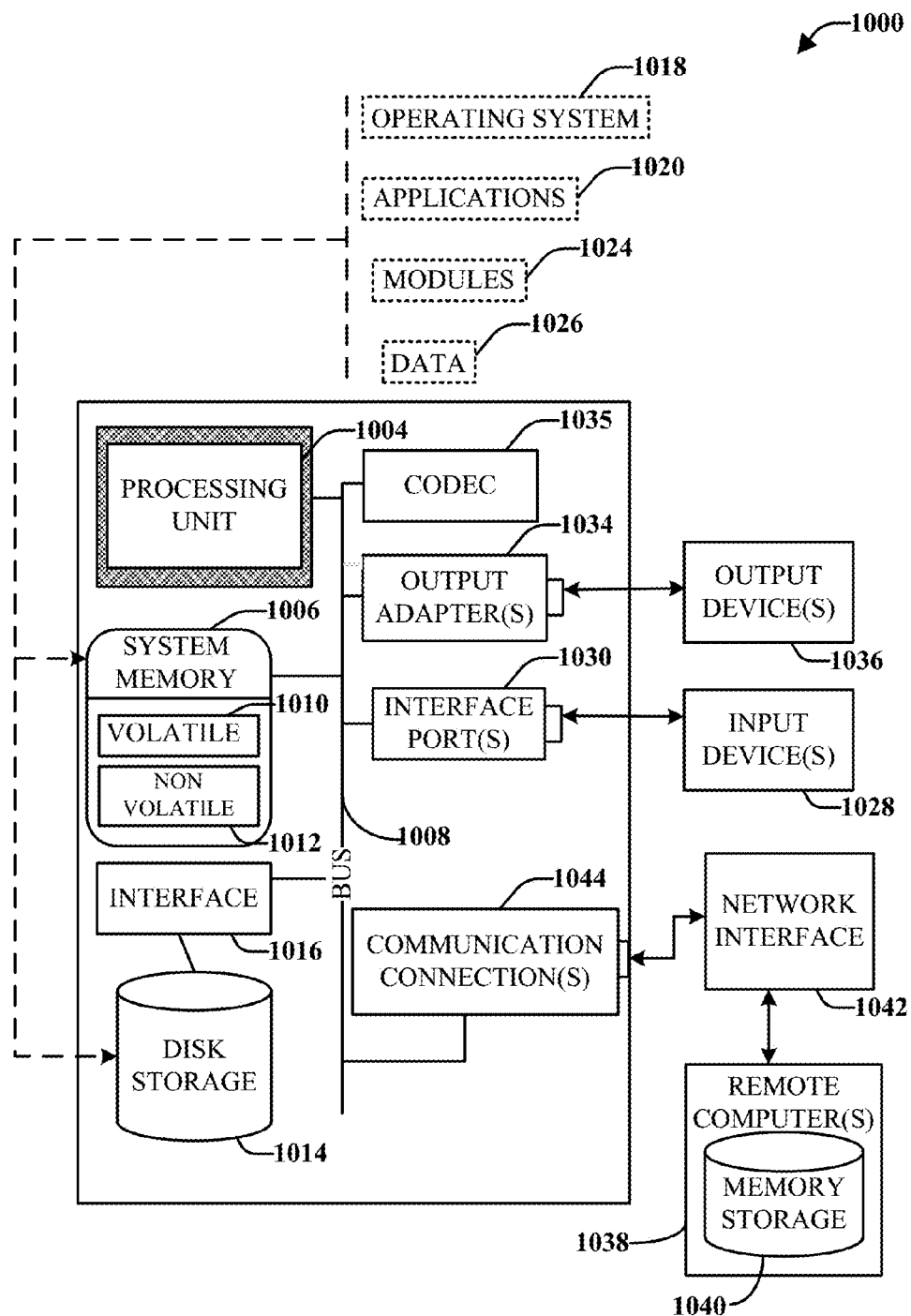
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available suitable processors. Dual microprocessors and other multiprocessor architectures also can be employed as the processing unit 1004.

The system bus 1008 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 10104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
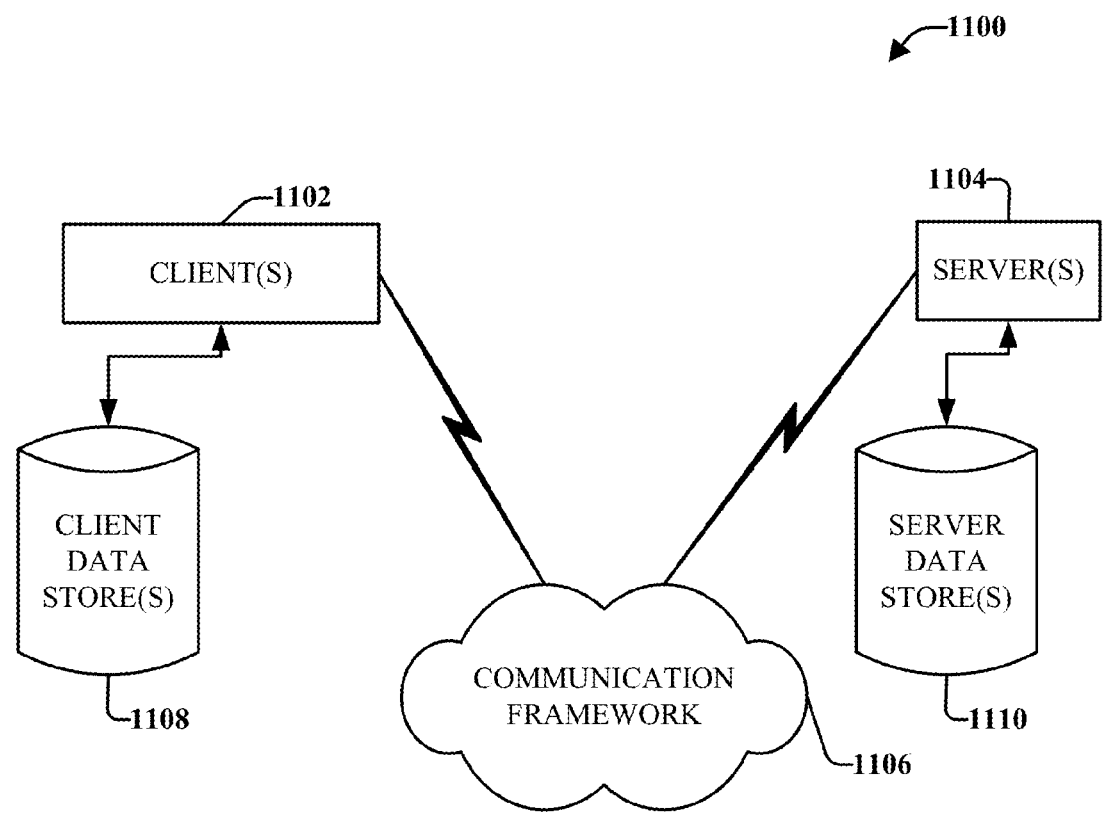
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
   a memory; and
   a hardware processor that, when executing computer-implemented instructions stored in the memory, is configured to:
   receive information identifying a second user account associated with a network source that a user of a first user account has selected to send a connection invitation;
   determine context information relating to the selection of the second user account by the user of the first user account, wherein the context information includes (i) information indicating that a video item associated with the second user account was presented in connection with the connection invitation and (ii) information associated with the video item;
   determine contact information associated with the second user account based on the information identifying the second user account;
   generate the connection invitation that connects the second user account with the first user account via the network source, wherein the connection invitation includes information identifying the first user account and the information identifying the video item associated with the second user that was presented to the first user account when the user of the first user account selected to send the connection invitation; and
   cause the connection invitation to be sent via the network source to the second user account using the determined contact information.

2. The system of claim 1, wherein the information identifying the second user account includes the determined contact information.

3. The system of claim 1, wherein the context information indicates where the first user identified the second user account and the video item.

4. The system of claim 1, wherein the video item is associated with second user account based on a comment provided by the second user at the network source in connection with the video item, and wherein the connection invitation further includes information relating to the comment provided by the second user at the network source in connection with the video item.

5. The system of claim 1, wherein the hardware processor is further configured to determine contact information for the first user that has been previously stored on a device associated with the second user, and wherein the connection invitation further includes the contact information for the first user that has been previously stored on the device associated with the second user.

6. The system of claim 1, wherein the hardware processor is further configured to determine information relating the first user account with the second user account, including social graph information relating the first user account and the second user account, wherein the connection invitation further includes the social graph information.

7. The system of claim 1, wherein the hardware processor is further configured to prevent the connection invitation from being received by the second user account based on blocking information for the second user account associated with the context information relating to the selection of the second user account by the user of the first user account.

8. A non-transitory computer-readable medium comprising computer-executable instructions that, when executed by a processor, cause the processor to perform a method, the method comprising:

receiving information identifying a second user account associated with a network source that a user of a first user account has selected to send a connection invitation;

determining context information relating to the selection of the second user account by the user of the first user account, wherein the context information includes (i) information indicating that a video item associated with the second user account was presented in connection with the connection invitation and (ii) information associated with the video item;

generating the connection invitation that connects the second user account with the first user account via the network source, wherein the connection invitation includes information identifying the first user account and the information identifying the video item associated with the second user that was presented to the first user account when the user of the first user account selected to send the connection invitation;

determining contact information associated with the second user account based on the information identifying the second user account; and causing the connection invitation to be sent via the network source to the second user account using the determined contact information.

9. The non-transitory computer-readable medium of claim 8, wherein the information identifying the second user account includes the determined contact information.

10. The non-transitory computer-readable medium of claim 8, wherein the context information indicates where the first user identified the second user account and the video item.

11. The non-transitory computer-readable medium of claim 8, wherein the video item is associated with second user account based on a comment provided by the second user at the network source in connection with the video item, and wherein the connection invitation further includes information relating to the comment provided by the second user at the network source in connection with the video item.

12. The non-transitory computer-readable medium of claim 8, wherein the method further comprises:
determining contact information for the first user that has been previously stored on a device associated with the second user, wherein the connection invitation further includes the contact information for the first user that has been previously stored on the device associated with the second user.

13. The non-transitory computer-readable medium of claim 8, wherein the method further comprises:
determining information relating the first user account with the second user account, including social graph information relating the first user account and the second user account, wherein the connection invitation further includes the social graph information.

14. The non-transitory computer-readable medium of claim 8, wherein the method further comprises:
preventing the connection invitation from being received by the second user account based on blocking information for the second user account associated with the context information relating to the selection of the second user account by the user of the first user account.

15. A method comprising:
receiving, using a hardware processor, information identifying a second user account associated with a network source that a user of a first user account has selected to send a connection invitation;

determining, using the hardware processor, context information relating to the selection of the second user account by the user of the first user account, wherein the context information includes (i) information indicating that a video item associated with the second user account was presented in connection with the connection invitation and (ii) information associated with the video item;

determining, using the hardware processor, contact information associated with the second user account based on the information identifying the second user account;

generating, using the hardware processor, the connection invitation that connects the second user account with the first user account via the network source, wherein the connection invitation includes information identifying the first user account and the information identifying the video item associated with the second user that was presented to the first user account when the user of the first user account selected to send the connection invitation; and causing, using the hardware processor, the connection invitation to be sent via the network source to the second user account using the determined contact information.

16. The method of claim 15, wherein the information identifying the second user account includes the determined contact information.

17. The method of claim 15, wherein the context information indicates where the first user identified the second user account and the video item.

18. The method of claim 15, wherein the video item is associated with second user account based on a comment provided by the second user at the network source in connection with the video item, and wherein the connection invitation further includes information relating to the comment provided by the second user at the network source in connection with the video item.

19. The method of claim 15, further comprising:
determining contact information for the first user that has been previously stored on a device associated with the second user, wherein the connection invitation further includes the contact information for the first user that has been previously stored on the device associated with the second user.

20. The method of claim 15, further comprising:
determining information relating the first user account with the second user account, including social graph information relating the first user account and the second user account, wherein the connection invitation further includes the social graph information.

21. The method of claim 15, further comprising:
preventing the connection invitation from being received by the second user account based on blocking information for the second user account associated with the context information relating to the selection of the second user account by the user of the first user account.

* * * * *